United States Patent [19]

Frisby

[11] 4,118,091

[45] Oct. 3, 1978

[54] ELECTRICAL CONNECTION ASSEMBLIES

[75] Inventor: Reg Alan Frisby, Long Eaton, England

[73] Assignee: TRW Inc., Cleveland, Ohio

[21] Appl. No.: 730,668

[22] Filed: Oct. 7, 1976

[30] Foreign Application Priority Data

Oct. 8, 1975 [GB] United Kingdom ............... 41213/75

[51] Int. Cl.² .............................................. H01R 3/06
[52] U.S. Cl. ............................... 339/14 R; 339/47 C; 339/49 R; 339/95 D
[58] Field of Search ................ 339/14 R, 14 L, 14 P, 339/17 N, 47 R, 47 C, 49 R, 95 R, 95 D, 96, 97 R, 97 P, 97 T, 198 R, 198 G, 198 H, 198 P, 214 R, 214 C, 214 S

[56] References Cited

U.S. PATENT DOCUMENTS

| 2,890,436 | 6/1959 | Bentley | 339/95 D X |
|---|---|---|---|
| 3,234,498 | 2/1966 | Logan | 339/97 P |
| 3,239,796 | 3/1966 | Buchanan et al. | 339/97 P |
| 3,760,335 | 9/1973 | Roberts | 339/99 R |
| 3,951,489 | 4/1976 | Bromberg | 339/14 R |

FOREIGN PATENT DOCUMENTS

| 1,188,789 | 4/1970 | United Kingdom | 339/98 |
|---|---|---|---|
| 1,361,114 | 7/1974 | United Kingdom | 339/97 P |
| 1,391,158 | 4/1975 | United Kingdom | 339/97 C |

Primary Examiner—Roy Lake
Assistant Examiner—DeWalden W. Jones
Attorney, Agent, or Firm—Neuman, Williams, Anderson & Olson

[57] ABSTRACT

An input connection assembly comprises a holder of electrically insulating material having a well intermediate its ends, in which well are located at one end a U-shaped metal input terminal, at the other end a U-shaped metal output terminal, and intermediate the input and output terminals a U-shaped metal connection member. A jack plug can be inserted for test or interconnection purposes between said connection and terminal members. The holder contains two such current conducting systems in side-by-side relationship separated by insulating barriers and is received in a spring metal clip having an earth contact extending into the holder. Over-voltage protection devices are located between the input terminal members and the earth contact. A multiplicity of said assemblies are arranged in an array for terminating subscriber's lines at a telephone exchange. The terminal members have slots for stripping, connecting and holding wires.

35 Claims, 6 Drawing Figures

ELECTRICAL CONNECTION ASSEMBLIES

This invention relates to apparatus for use in telephone exchanges of the newly-developed kind in which the connection of one subscriber to another is achieved by means of reed or electronic switching devices which operate under the control of electronic routing or selection circuits.

In comparison with the prior electro-mechanical switching systems (e.g. the Strowger-system), the new switching devices and their electronic control devices occupy considerably less space than their earlier counterparts, with a consequence that the volume occupied by the conventional equipment (main and intermediate distribution frames) for connecting subscribers lines at the incoming cable terminations to the electronic control devices in the desired manner and for providing over-voltage and over-current protection, grading of subscribers, and test jacking facilities now represents a much greater part of the total volume of a new exchange.

The present invention seeks to provide an improved input connection assembly for providing a permanent termination, for the insulated wire conductors which constitute a subscriber's line at a main distribution frame, and for readily connecting them there through other insulated wire conductors with appropriate electronically controlled switching equipment of the exchange.

According to one feature of the present invention such an input connection assembly comprises a holder of an electrically-insulating material, the holder having a well intermediate its ends, in which well are accommodated in a tandem manner an input terminal member disposed at one end of the holder, an output terminal member disposed at the opposite end of the holder and between those two terminal members an intermediate connection member having oppositely-disposed contact-making parts which make electrical contact with opposing contact-making parts of the respective terminal members so as to provide a continuous current-conducting path between the input and output terminal members, the contact-making parts of the intermediate connection member and of the terminal members being shaped in such manner and having such resilience as to enable an electrical test or interconnection jack plug to be inserted between contact-making parts of the intermediate connection member and opposing contact making parts of one or the other terminal members so separating them, so that contact-making parts carried on one or both faces of the jack plug may then provide electrical connection for test or interconnection purposes with the intermediate connection member or/and one or the other terminal member.

Preferably, each terminal member comprises a U-shaped metal strip of which the base part lies within the well, the end remote from the intermediate connection member is provided with conductor receiving parts for receiving and making good electrical contact with a wire conductor to be connected therewith, and the other end carries the said contact-making parts.

Preferably, the intermediate connection member is a U-shaped metal strip, of which the base part is secured within the base of the said well, and the respective limbs press resiliently on the respective inner limbs of the respective terminal members. Advantageously, the limbs of the intermediate connection member have less stiffness than and hence are more easily deflected than the adjacent limbs of the terminal members, so that on insertion between the intermediate connection member and a terminal member, a jack plug preferentially deflects the adjacent limb of the intermediate connection member.

According to another preferred feature of the present invention the holder also carries an earth terminal member disposed adjacent to but separated from the input terminal member, the input and earth terminal members being arranged to receive between them, and to connect with, the respective terminals of an over-voltage protection device when it is inserted therebetween. Preferably, the said protection device is a gas discharge device, and is resiliently engaged at its respective ends by the input and earth terminal members respectively.

Conveniently, the earth terminal member comprises a metal strip which extends through the base of the holder into the said well, and advantageously the earth terminal member comprises an upstanding part of a metal fixing clip into which the holder is arranged to be fitted and secured. Conveniently the fixing clip has opposed upstanding resilient fingers between which the holder is snap-fitted and retained.

The holder may carry, in addition to the current conducting system constituted by the input and output terminal members and the intermediate connection member, at least one other current conducting system similar to the first-mentioned one, the respective current conducting systems being disposed alongside but spaced from one another, with the respective input terminal members disposed at one and the same end of the holder, and the respective output terminal members disposed at the opposite end of the holder.

Conveniently, only two such current conducting systems are carried in one said holder, the resulting assembly being suitable for accommodating a pair of insulated wire conductors which together constitute a subscriber's line to an exchange. In such a twin-conductor assembly there is preferably provided a single earth terminal member which is common to the two current conducting systems of the assembly. Such common earth terminal member may be disposed between the base parts of the respective U-shaped strip metal input terminal members and make contact with the terminals of respective over-voltage protection devices which cooperate with the respective Fbeing carried in a withdd holor receiving and carrying the respective over-voltage protection devices, the blind ends of those holes having formed therein small windows through which the said contact-making parts of the respective input terminal members may make electrical contact with the respective protection devices. The conductive metal parts of the two current conducting systems are preferably physically separated from one another by electrically-insulating barrier parts of the holder.

According to another preferred feature of the present invention each of the said input and output terminal members has associated with its said conductor-receiving parts a restraining means for receiving and engaging an insulated part of the wire conductor which lies adjacent the part of the conductor which is received and engaged by the said conductor-receiving parts, so as to prevent movement of the said insulated part of the wire conductor relative to the said part engaged by the said conductor receiving parts.

Preferably, the said conductor-receiving parts of such a strip metal terminal member are constituted by a conductor-receiving slot formed in the strip metal member, the width of the slot being slightly less than the width of the wire conductor to be connected to the terminal member so that the slot sides bite into and resiliently engage the wire conductor when the wire conductor is pressed into the slot.

In a preferred form of a said strip metal terminal member, a free end part of the terminal member is bent back upon an adjacent part so as to lie substantially parallel therewith but spaced therefrom, the said conductor-receiving slot is formed in the said adjacent part of the terminal member, and the said restraining means is constituted by a restraining slot which is formed in the said free end part, which is aligned with, extends to, and opens into the said conductor-receiving slot, and which has a width which is less than that of the insulated wire conductor, to be received thereby by an amount sufficient to substantially compress but not cut or shear the conductor insulation. The sides of the said restraining slot are preferably notched so as to provide spaces into which a plastics insulation material which insulates the wire conductor may cold flow and thereby mould itself into a form which resists unwanted movement of the insulated conductor along the slot. The said retaining slot is preferably open-ended at the free extremity of the said free end part of the terminal member. This enables the parts of the strip metal which define the said retaining slot to readily have the degree of resilience necessary to restrain the insulated wire conductor without damaging the insulation surrounding the conductor.

The said preferred form of strip metal terminal member enables an insulated wire conductor to be electrically and mechanically engged in the terminal member without first stripping the insulation from the free end of the wire conductor, simply by pressing the insulated wire conductor end transversely into the composite restraining and conductor-receiving slot, the sides of the conductor-receiving slot biting through the conductor insulation into the conductor itself, and the sides of the restraining slot compressively engaging adjacent parts of the conductor insulation.

One twin-conductor input connection assembly according to the present invention for use in an electronic telephone exchange, and a plurality of such assemblies having a common fixing clip, will now be described by way of example and with reference to the accompanying drawings, in which:-

Figures 1, 4, 5, 6:
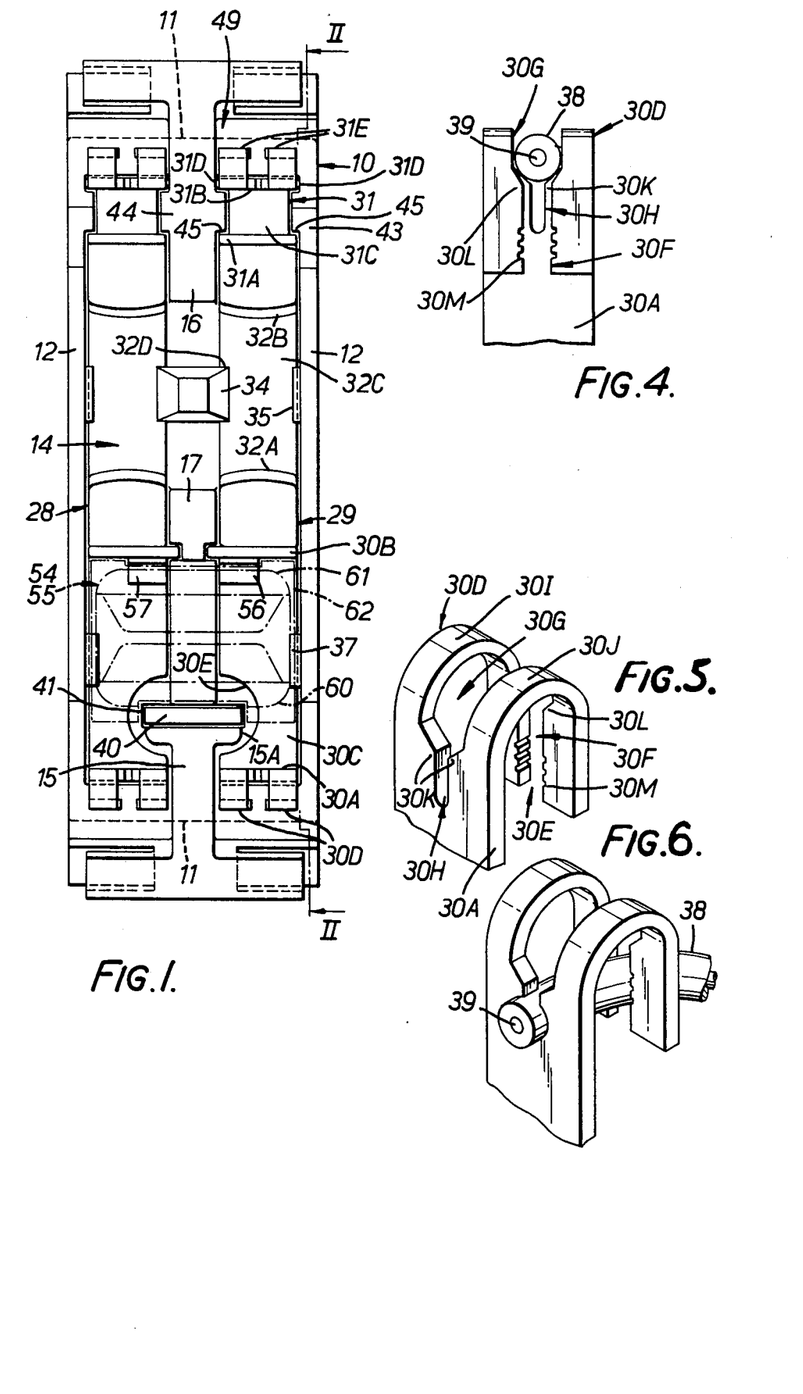
FIG. 1 is a plan view of the said assembly.
FIG. 4 is an end view of wire-receiving part of a terminal used in the assembly — as seen at IV—IV in FIG. 2.
FIG. 5 is a perspective view of wire-receiving part shown in FIG. 4.
FIG. 6 is a view similar to that of FIG. 5, but with a wire engaged in the wire-receiving part.
Figure 2:
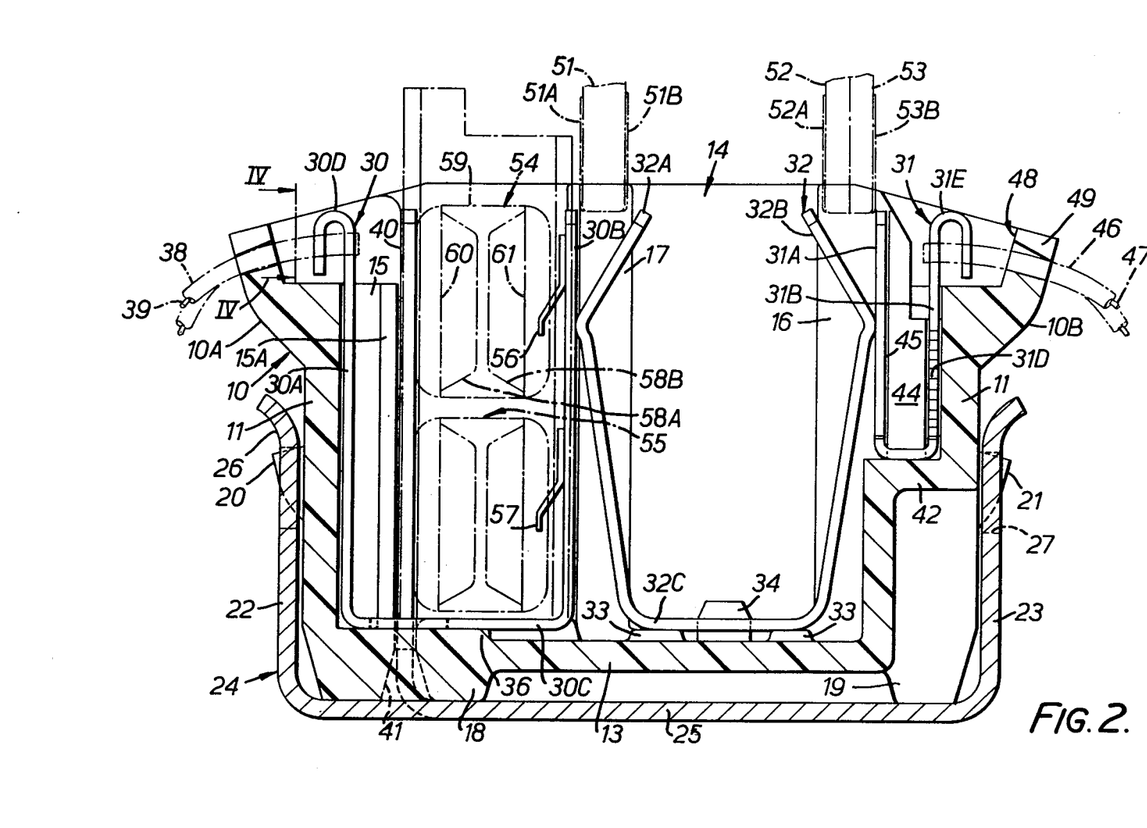
FIG. 2 is a sectional view taken on the section II—II of FIG. 1.

Referring now to the FIGS. 1 and 2, the input connection assembly there shown includes a holder 10 moulded from a resilient reinforced thermoplastics material (e.g. glass reinforced polycarbonate or polyester).

The holder includes end walls 11, side walls 12 and a base 13, which together define a well 14.

Within the well integrally-formed barriers 15, 16 extend centrally from the respective end walls 11, and an integrally-formed column 17 stands up centrally from the base 13. Externally the base is provided with two spaced integral feet 18 at one end, and a single central foot 19 at the other end. The end walls carry externally integral location lugs 20, 21.

The holder is secured between resilient fingers 22, 23 of a sheet metal fixing clip 24, (which may conveniently be made of a plated mild steel), with the feet 18, 19 resting on the baseplate 25 of the clip, the lug 20 engaging under the lip of a lateral extension 26 of the finger 22, and the lug 21 engaging under the edge of a hole 27 formed in the finger 23.

The holder houses in its well two similar, parallel-mounted, transversely-spaced current conducting sytems 28, 29, each of which includes a U-shaped, strip metal, input terminal member 30 mounted at the input end 10A of the holder, a U-shaped output terminal member 31 mounted at the output end 10B of the holder, and between those terminal members a U-shaped, strip metal intermediate connection member 32. These strip metal members have the shapes and configurations which are shown in the figures, and are made of a springy strip metal, such as for example, nickel-silver or phosphor bronze. The strip metal used for the intermediate connection member 32 is of a thickness slightly smaller than that of the strip metal used for the terminal members 30, 31, and that connection member is shaped so that its limbs 32A, 32B bear resiliently against and make good electrical contact with the adjacent upright limbs 30B and 31A of the terminal members 30, 31, and so that its limbs 32A, 32B are of lower stiffness than the adjacent terminal member limbs 30B, 31A.

For convenience, the input and output terminal members 30, 31 will be referred in the following description simply as terminals 30, 31, and the intermediate connection member 32 as the connector 32.

The base part 32C of each connector 32 rests on pads 33 raised from the base of the holder, is located by a guide member 34 which likewise rises from the holder base and which engages in a rectangular notch 32D formed in the side of the connector base part 32C, and is retained in position by a lug 35 which projects from the adjacent side wall of the holder. The limbs 32A, 32B of the connector are constrained at their respective sides by the adjacent side wall 12 of the holder and the central barrier 16 and column 17.

Each input terminal 30 has its base part 30C resting on a raised part 36 of the holder base 13, and is held in position by a lug 37 which projects transversely from the adjacent side wall of the holder. The limb 30B is of greater transverse width than the limb 30A, and is constrained on one side by the holder side wall 12 and on the other side by the central pillar 17, into which it is recessed.

The limb 30A carries at its upper end a bifurcated hooked part 30D for receiving and restraining an insulated 'input' wire conductor end 38, and for making electrical contact with the 'input' wire conductor 39 without first stripping off any of the surrounding insulation.

This insulated conductor receiving hooked part 30D will be described in further detail later in this specification.

The base part 30C of each input terminal 30 has formed there a semi-circular notch 30E which circumscribes one side of an upstanding earth terminal metal strip 40 which is formed integrally with the base part 25 of the fixing clip 24 and which extends through an aperture 41 in the base 13 of the holder. A lower part of the earth terminal strip lies adjacent a transversely-enlarged, vertical side part 15A of the central barrier 15, which acts as a backing member for resisting excessive deflection of that terminal, as will appear later.

Each output terminal 31 has its base part 31C resting on a raised part 42 of the holder base 13, and is held in position by barbs 31D which project transversely from the sides of the limb 31B and which engage the side wall 12 of the holder and the central barrier 16. Vertical ribs 43, 44 formed integrally on the side wall 12 and central barrier 16 provide vertical backing shoulders 45 for limiting the deflection of the limb 31A from its normal upright position. Each limb 31B carries at its upper end a bifurcated hooked part 31E for receiving and restraining an insulated 'output' wire conductor end 46, and for making electrical contact with the 'output' wire conductor 47 without first stripping off any of the surrounding insulation. This 'output' hooked part 31E is similar to the 'input' hooked part 30D.

The construction of the hook parts 30D and 31E is best seen in the FIGS. 4 to 6, where one 'input' hooked part 30D is illustrated. This hooked part is produced by forming an open-ended slot 30E in the free end of the limb 30A, which slot has three adjoining sections 30F, 30G, 30H of different widths. At the section 30F adjoining the open end of the slot, the slot width is slightly less than the overall diameter of a plastics-insulated wire conductor 38 to be electrically connected to the limb 30A; at the section 30H adjoining the closed end of the slot, the slot width is slightly less than the diameter of the bare wire conductor 39; and at the intermediate section 30G of the slot, the slot width is slightly greater than the said overall diameter of the insulated conductor 38. The two arms 30I, 30J defining the said open-ended slot are then bent over in the manner shown, so as to bring the slot section 30F of intermediate width into horizontal alignment with the slot section 30H of least width, the slot section 30G of greatest width then lying uppermost, in the bend of the two arms.

The width of the narrow slot section 30H and the sharp-edged shoulders 30K formed at the junction of the sections 30H, 30G of least and greatest widths are such that when an insulated wire conductor 38 is placed in the uppermost, widest slot section 30G and is then pressed towards the narrower slot sections 30F, 30H, channels are sheared by those shoulders through the insulation and through parts at both sides of the wire conductor. As the wire conductor is pressed deeper into the narrow slot section 30H the wire conductor becomes wedged between the parts defining the narrow slot, which parts were sprung open slightly when the conductor first entered the narrow slot section. Finally, the conductor comes to rest at the closed end of the slot, and in this condition is in good electrical connection with the input terminal 30.

The width of the slot section 30F of intermediate width and the rounded shoulders 30L at the transition between that section and the adjoining section 30G of greatest width are such that as the insulated conductor was pressed into the narrow slot section 30H, the insulation on both sides of the conductor was compressed but not sheared or otherwise damaged by the parts defining the slot section 30F so as to provide a clamping action which restrains the insulated conductor against movement.

This prevents the conductor 39 at the highly stressed point where it is gripped in the narrow slot 30H from being moved transversely.

To inhibit movement of the insulated conductor 38 in the longitudinal direction of the slot 30E, the parts defining the intermediate width slot section 30F are provided with a plurality of spaced, transverse, V-shaped notches 30M into which a plastics insulation material surrounding the conductor 39 can cold-flow, and so acquire external V-shaped projections which engage in the said notches.

To connect an insulated wire conductor to the input (or output) terminal, the insulated conductor is trimmed to approximately the right length and is then placed from above into the slot at the top of the hooked part of the terminal, with the free end projecting slightly beyond the limb 30A towards the center of the well 14, and the insulated conductor is then pressed by a specially-shaped tool (designed to follow the wire into the three slot sections) into the narrower parts of the slot, so as to connect the conductor with the terminal and simultaneously restrain the insulated conductor. The tool is also arranged to trim the free end of insulated conductor so that only a short length remains projecting from the limb 30A.

In order to further restrain the insulated wires, each end wall 11 has an integral, upstanding, T-shaped bollard 48 under the wings 49, 50 of which the insulated conductors are introduced, from the side, prior to connecting them with the adjacent terminal.

In use the fixing clip is first secured, by screws for example, to a mounting member of a main distribution frame in a telephone exchange, and the holder 10, having the two current conducting systems 28, 29 in place, is snap-fitted between the resilient fingers of the clip. Two 'input' insulated wire conductors 38, constituting the exchange-end of a subscriber's line, are connected to respective input terminals 30 in the manner already described. Two 'output' insulated wire conductors 46, constituting the input conductors for appropriate electronic control and switching devices of the exchange, are connected to the output terminals 31, thus connecting the subscriber's line to the said devices.

Should a telephone engineer wish to test the subscriber's line and equipment, or the associated electronic devices in the exchange or the path thereto, he can insert a test jack plug 51 between the resilient connector limbs 32A and the adjacent upright limbs 30B of the input terminal members 30. This jack plug, which straddles the central column 17, deflects the connector limbs as it enters the holder, and electrical contacts 51A carried on the 'input' side of the plug make contact with the respective input terminal limbs 30B, whilst electrical contacts 51B carried on the 'output' side of the plug make contact with the respective connector limbs 32A. The plug may be provided with appropriate locating devices which engage with complementary devices provided on or in the side walls 12 of the holder (or on or in the central column 17) whereby to locate and polarize the plug so as to prevent its being inserted in a wrong position or manner.

If regarding of the subscriber (because of a change in the nature of his telephone 'traffic') requires the subscriber's line to be connected with electronic devices of the exchange other than those connected to the output terminals 31 of the assembly by the conductors 46, this is readily achieved by the use of a jumper lead having attached to its respective ends an 'input' jumper plug 52 and an 'output' jumper plug 53.

The input jumper plug is provided on one face only, the 'input' face, with a pair of electrical contacts 52A. Likewise, the output jumper plug is provided on one face only, the 'output' face, with a pair of electrical contacts 53B.

Interconnection of a subscriber's line connected to the input terminals of a first input connection assembly, with exchange equipment connected with the output terminals of a second input connection assembly is then achieved by inserting the input jumper plug in the first assembly between the connector limbs 32B and the output terminal limbs 31A, with the said input face facing the connection limbs 32B, thus connecting the jumper leads with the subscriber's line connected to the first assembly; and by inserting the output jumper plug in the second assembly between the connector limbs 32B and the output terminal limbs 31A, with the said output face facing the output terminal limbs 31A, thus connecting the jumper leads with the exchange equipment connected to the second assembly.

To then interconnect the exchange equipment connected to the first assembly with the subscriber's line connected with the second or another such assembly, a second and similar jumper lead has its output jumper plug 53 inserted in the first assembly, between the input jumper plug 52 of the first jumper lead and the output terminal limbs 31A, with the said output face of the output plug facing those terminal limbs, thus connecting the respective conductors of the second jumper lead with the exchange equipment connected with the first assembly. The desired interconnection is then finally achieved by inserting the input plug 52 of the second jumper lead in the second (or another) assembly between the connector limbs 32B and the output plug 53 of the first (or another) jumper lead (or output terminal limbs 31A, if no such output jumper plug is present) with the said input face facing the connector limbs 32B. In this way any number of interconnections can be made in a main distribution frame simply by the use of appropriate jumper leads having input and output jumper plugs.

Means may be provided to polarize the jumper plugs so as to prevent their entry in the wrong manner, or even in the wrong position. It is not necessary to insert both an input and an output jumper plug in an assembly when an interconnection is desired since the assemblies will accept, and are arranged to work with, only one such jumper plug; this allows for the fact that some of the exchange equipment may not be required for the time being.

In order to protect the low voltage electronic devices at the exchange from over-voltages which may be developed in a subscriber's line, for example due to lightning strikes, over-voltage protection devices 54, 55 maybe disposed one above the other between the upstanding earth terminal 40 and resilient contacts 56, 57 carried in an offset manner on the respective input terminal limbs 30B. These protective devices are preferably of the gas-discharge type having two electrodes 58A, 58B, facing one another in a glass envelope 59, which is filled with an inert gas at low pressure and which has metal end terminals 60, 61. The devices are carried in blind holes formed in a block 62 of insulating material, which block is shaped in plan view to fit around the sides of the earth terminal, likewise around the contacts 56, 57. The latter are arranged to extend through small windows formed in the blind ends of the blind holes which house the protective devices, and to make contact there with the respective end terminals 61 of the devices.

The block 62 constitutes a removable plug which can be readily withdrawn from the holder 10 for the inspection and replacement of the protective devices. The block 62 also carries at its exposed free end references indicating the identity of the circuit passing through the particular input connection assembly.

Figure 3:
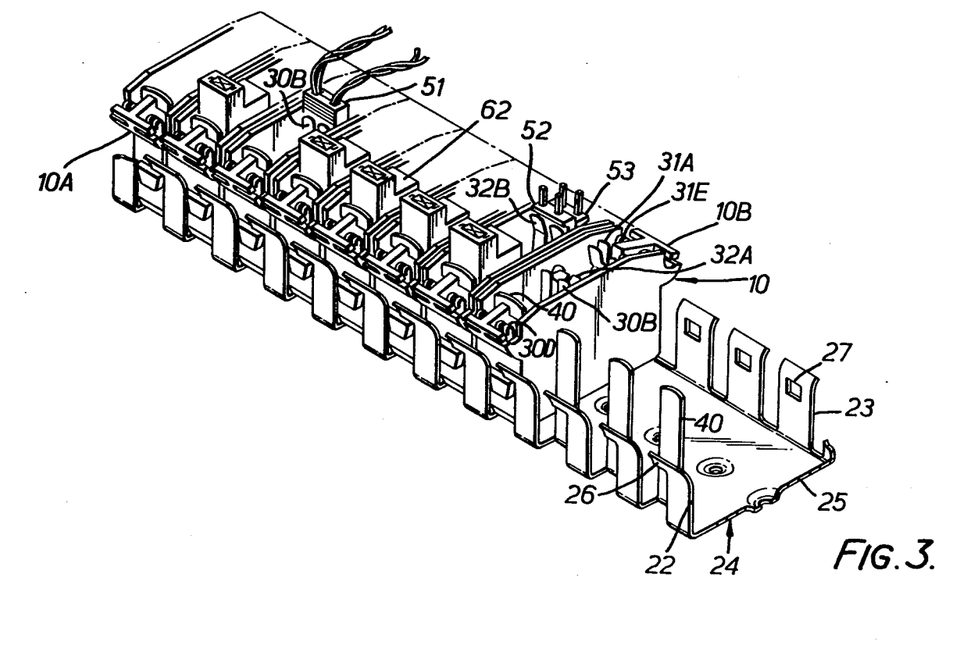
FIG. 3 is a perspective view of a plurality of the assemblies shown in the FIGS. 1 and 2 having a common fixing clip.

In practice the input connection assembly described above would be used in close association with many other similar assemblies, the respective holders of those assemblies being held between resilient fingers of a composite common fixing clip. Such an arrangement is shown in FIG. 3. In that figure no input or output wiring is shown, though a test jack plug is shown in position in one of the assemblies, and a pair of jumper plugs is shown in another of the assemblies. The figure also shows that the fixing clip is provided with dished fixing hole parts disposed at intervals along the center-line of the common base-plate of the fixing clip.

The conductor receiving and restraining parts 30D and 31E of the input and output terminals 30 and 31 may be used on other forms of terminals and in other forms of apparatus, wherever convenient.

What is claimed is:

1. An input connection assembly comprising a holder of an electrically insulating material; said holder having two ends and defining a well intermediate its ends, in which well are accommodated in a tandem manner an input terminal member disposed at one end of the holder, an output terminal member disposed at the opposite end of the holder, and between those two terminal members an intermediate connection member having oppositely-disposed contact-making parts which make electrical contact with opposing contact-making parts of the respective terminal members so as to provide a continuous current conducting path between the input and output terminal members, said contact-making parts comprising at least two separable elements which normally press resiliently against one another for so completing such path between said intermediate connection member and one of said terminal members, at least one of said elements being resiliently movable for deflection from the respective opposing element whereby an electrical test or interconnection jack plug may be inserted between said elements thereby separating them and providing electrical connection of such an inserted plug with at least one of said members.

2. An assembly as claimed in claim 1, wherein each terminal member comprises a U-shaped metal strip of which the base part lies within the well, the end remote from the intermediate connection member is provided with conductor receiving parts for receiving and making good electrical contact with a wire conductor to be connected therewith, and the other end carries the said contact-making parts.

3. An assembly as claimed in claim 1, wherein the intermediate connection member is a U-shaped metal strip, of which the base part is secured within the base of the said well, and the respective limbs press resiliently on the respective contact parts of the respective terminal members.

4. An assembly as claimed in claim 3, wherein the limbs of the intermediate connection member are of resilient construction and the adjacent contact parts of said terminal members are of relatively rigid construction whereby the insertion of a sack plug preferentially deflects the adjacent limb of the intermediate connection member.

5. An assembly as claimed in claim 1, wherein the holder also includes an earth terminal member disposed adjacent to but separated from the input terminal member, the input and earth terminal members being arranged to receive between them, and to connect with, the respective terminals of an overvoltage protection device when it is inserted therebetween.

6. An assembly as in claim 5, including a protection device comprising a gas discharge device disposed between said earth terminal member and said input terminal and resiliently engaged at its respective ends by the input and earth terminal members respectively.

7. An assembly as claimed in claim 5 wherein the earth terminal member comprises a metal strip which extends through the base of the holder into the said well.

8. An assembly as claimed in claim 7, wherein the earth terminal member comprises an upstanding part of a metal fixing clip into which the holder is arranged to be fitted and secured.

9. An assembly as claimed in claim 8, wherein the fixing clip has opposed upstanding resilient fingers between which the holder is snap-fitted and retained.

10. An assembly as claimed in claim 1, wherein the holder carries in addition to the current conducting system constituted by the input and output terminal members and the intermediate connection member, at least one other current conducting system similar to the first-mentioned one, the respective current conducting systems being disposed alongside but spaced from one another, with the respective input terminal members disposed at one and the same end of the holder, and the respective output terminal members disposed at the opposite end of the holder.

11. An assembly as claimed in claim 10, wherein only two such current conducting systems are carried in one said holder, the resulting assembly being suitable for accommodating a pair of insulated wire conductors which together constitute a subscriber's line to an exchange.

12. An assembly as claimed in claim 11, wherein a single earth terminal member is provided which is common to the two current conducting systems of the assembly.

13. An assembly as in claim 12 wherein each of said input terminal members is of U-shaped strip metal and the common earth terminal member is disposed between the base parts of respective U-shaped input terminal members to make contact with the terminals of respective overvoltage protection devices which cooperate with the respective input terminal members.

14. An assembly as claimed in claim 12, wherein the common earth terminal comprises an upstanding part of a metal fixing clip which is arranged to receive, and retain, alongside one another in snap-in manner a plurality of said holders.

15. An assembly as claimed in claim 13, wherein two over-voltage protection devices are disposed one above the other within the depth of the holder well.

16. An assembly as claimed in claim 15, wherein the over-voltage protection devices are carried in a withdrawable plug of an electrically-insulating material, the plug being capable of being inserted into the space between the common earth terminal member and the inner limbs of the respective input terminal members.

17. An assembly as claimed in claim 16, wherein the plug has formed therein two blind holes for receiving and carrying the respective over-voltage protection devices, the blind ends of those holes having formed therein small windows through which contact-making parts of the respective input terminal members may make electrical contact with the respective protection devices.

18. An assembly as in claim 11, wherein the holder includes electrically-insulating barrier parts which physically separate conductive metal parts of the two current conducting systems.

19. An assembly as claimed in claim 2, wherein each of the said input and output terminal members has associated with its said conductor-receiving parts a restraining means for receiving and engaging an insulated part of a wire conductor which lies adjacent the part of such a conductor which is received and engaged by the said conductor-receiving parts, so as to prevent movement of the said insulated part of the wire conductor relative to the said part engaged by the said conductor-receiving parts.

20. An assembly as claimed in claim 19, wherein said conductor-receiving parts of each terminal member are constituted by a conductor-receiving slot in the terminal member, and the width of the slot being slightly less than the width of the wire conductor to be connected to the terminal member so that the slot sides bite into and resiliently engage the wire conductor when the wire conductor is pressed into the slot.

21. An assembly as claimed in claim 20, wherein a free end part of each terminal member is bent back upon an adjacent part so as to lie substantially parallel therewith but spaced therefrom, the said conductor-receiving slot is formed in the said adjacent part of the terminal member and the said restraining means is constituted by a restraining slot which is formed in the said free end part, which is aligned with, extends to, and opens into the said conductor-receiving slot, and which has a width which is less than that of the insulated wire conductor to be received therein by an amount sufficient to substantially compress but not cut the conductor insulation.

22. An assembly as claimed in claim 21, wherein the sides of the said restraining slot are notched so as to provide spaces into which a plastics insulation material which insulates the wire conductor may cold-flow and thereby mould itself into a form which resists unwanted movement of the insulated conductor along the slot.

23. An assembly as claimed in claim 22, wherein the said retaining slot is open-ended at the free extremity of the said free end part of the terminal member.

24. An input connection assembly comprising a holder of an electrically insulating material, the holder having two opposed ends and defining a well intermediate said ends, in which well are accommodated in a tandem manner an input terminal member disposed at one of said ends of the holder, an output terminal member disposed at the opposite end of the holder, and between said terminal members an intermediate connection member having oppositely-disposed contact-making parts which make electrical contact with opposing contact-making parts of the respective terminal members so as to provide a continuous current-conducting path between said input and output terminal members; each of said terminal members comprising a U-shaped metal strip of which the base part lies within the well, the end remote from the intermediate connection member is provided with conductor receiving parts for receiving and making good electrical contact with a wire conductor to be connected therewith, and the other end carries the said contact-making parts, the contact-making parts of said intermediate connection member and of said terminal members being shaped in such manner and having such resilience as to enable an electrical test or interconnection jack plug to be inserted between contact-making parts of said intermediate connection member and opposing contact-making parts of at least one of the terminal members so separating them, whereby contact-making parts carried on at least one surface of the jack plug may then provide electrical connection with at least one of said members.

25. An assembly as in claim 1 wherein said elements have outer end portions of relatively divergent configuration such that when said elements are in their normal mutually contacting position an opening is provided between said outer end portions for entry of such a plug between said elements.

26. An input connection assembly comprising a holder of an electrically insulating material; an input terminal, an output terminal, and means for providing an intermediate connection therebetween supported on said holder; said intermediate connection means normally being in electrical contact with each of said terminals so as to provide a continuous current-conducting path between said input and output terminals; said intermediate connection means and at least one of said terminals having separable contact-making parts which normally bear resiliently againt one another so as to provide a continuous current-conducting path therebetween; at least one of said contact-making parts being resiliently movable and of a configuration to normally maintain such bearing contact and to accommodate resilient deflection away from the opposed contact-making part whereby a jack plug may be inserted between said contact-making parts of said intermediate connection means and said one of said terminals for electrical test or interconnection purposes and at least one of said contact-making parts thereby will contact one surface of such a plug for electrical connection with a contact-making part on such plug.

27. The assembly as in claim 26 wherein said terminals are arranged in a tandem manner.

28. The assembly as in claim 27 wherein said holder has ends and said terminals are disposed at said holder ends.

29. An assembly as in claim 28, wherein said holder carries in addition to a current conducting system constituted by said input and output terminals and said intermediate connection means, at least one other current conducting system similar to the first-mentioned system, the respective current conducting systems being disposed alongside but spaced from one another, with the respective input terminals disposed at the same end of the holder, and the respective output terminals disposed at the opposite end of the holder.

30. An assembly as in claim 26 wherein said contact-making parts have outer end portions of relatively divergent configuration such that when said contact-making parts are in the normal mutually contacting position an opening is provided between said outer end portions for entry of such a plug between said elements.

31. An assembly as in claim 30, including a set of such separable contact-making parts between said intermediate connection means and each of said terminals, each said set having such relatively divergent outer end portions to provide such an opening for so receiving a plug therebetween.

32. An assembly as in claim 26, wherein said holder includes an earth terminal member disposed adjacent to but separated from one of said terminals, said terminal and terminal member being adapted to receive between them, and to connect with, an overvoltage protection device when it is inserted therebetween.

33. An assembly as in claim 32, including a gas discharge overvoltage protection device disposed between and resiliently engaged by the input terminal and earth terminal member.

34. An assembly as in claim 32, including a metal fixing clip within which said holder is resiliently engaged.

35. An assembly as in claim 34, wherein said earth terminal member comprises a metal strip which is an upstanding part of said metal fixing clip and extends upwardly therefrom through the base of said holder.

* * * * *

UNITED STATES PATENT AND TRADEMARK OFFICE
CERTIFICATE OF CORRECTION

PATENT NO. : 4,118,091
DATED : October 3, 1978
INVENTOR(S) : Reg Alan Frisby

It is certified that error appears in the above-identified patent and that said Letters Patent are hereby corrected as shown below:

Col. 2, ll. 47-48 "Fbeing carried in a withdd holor" should read -- input terminal members. The common earth terminal preferably comprises an upstanding part of a metal fixing clip which is arranged to receive, and retain, alongside one another and in snap-in manner a plurality of said holders. The two over-voltage protection devices of each twin conductor connector assembly may be conveniently disposed one above the other within the depth of the holder well, preferably being carried in a withdrawable plug of an electrically-insulating material, the plug being capable of being inserted into the space between the common earth terminal member and the inner limbs of the respective input terminal members. The plug may have formed therein two blind holes for --. Col. 3, l. 17, "thereby" should read -- therein --. Column 3, l. 34, "engged" should read -- engaged --. Col. 6, l. 63, "Regarding" should read -- regrading --. Col. 9, l. 1, Claim 4, "sack" should read -- jack --.

Signed and Sealed this

Thirteenth Day of March 1979

[SEAL]

Attest:

RUTH C. MASON
Attesting Officer

DONALD W. BANNER
Commissioner of Patents and Trademarks